(12) United States Patent
Borremans et al.

(10) Patent No.: US 9,255,229 B2
(45) Date of Patent: Feb. 9, 2016

(54) HYDROCONVERSION PROCESS FOR HEAVY HYDROCARBONACEOUS FEEDSTOCK

(75) Inventors: Didier Borremans, Boussu (BE); Maxime Lacroix, Uccle (BE); Katell Le Lannic-Dromard, Le Havre (FR); Marie Ropars, Cleon (FR); Gloria Vendrell, Le Havre (FR)

(73) Assignee: TOTAL RAFFINAGE MARKETING, Puteaux (FR)

( * ) Notice: Subject to any disclaimer, the term of this patent is extended or adjusted under 35 U.S.C. 154(b) by 330 days.

(21) Appl. No.: 13/808,426

(22) PCT Filed: Jul. 5, 2011

(86) PCT No.: PCT/EP2011/061282
§ 371 (c)(1),
(2), (4) Date: Feb. 21, 2013

(87) PCT Pub. No.: WO2012/004244
PCT Pub. Date: Jan. 12, 2012

(65) Prior Publication Data
US 2013/0150637 A1 Jun. 13, 2013

(30) Foreign Application Priority Data
Jul. 5, 2011 (EP) ..................................... 10305745

(51) Int. Cl.
| | | |
|---|---|---|
| *C10G 65/12* | (2006.01) | |
| *C10G 47/12* | (2006.01) | |
| *C10G 47/16* | (2006.01) | |
| *C10G 47/20* | (2006.01) | |
| *B01J 31/22* | (2006.01) | |
| *C10G 49/00* | (2006.01) | |

(Continued)

(52) U.S. Cl.
CPC ............. *C10G 65/12* (2013.01); *B01J 31/2295* (2013.01); *C10G 49/00* (2013.01); *C10G 49/02* (2013.01);

(Continued)

(58) Field of Classification Search
CPC .................................................... C10G 65/12
USPC ..................... 585/241, 310; 208/97
See application file for complete search history.

(56) References Cited

U.S. PATENT DOCUMENTS

| 4,557,821 A | 12/1985 | Lopez et al. | |
|---|---|---|---|
| 4,592,827 A * | 6/1986 | Galiasso et al. | 208/59 |

(Continued)

FOREIGN PATENT DOCUMENTS

| CN | 1373008 A | 10/2002 |
|---|---|---|
| JP | 56-65636 A | 6/1981 |

(Continued)

OTHER PUBLICATIONS

Shi et al., Chemical structure change of recycling vacuum bottom residue from slurry-bed hydrocracking of Karamay Atmospheric residue in the pilot plant, 2003, Prepr. Pap-Am. Chem. Soc., Div. Fuel Chem., 48(2), 718-721.*

(Continued)

*Primary Examiner* — In Suk Bullock
*Assistant Examiner* — Youngsul Jeong
(74) *Attorney, Agent, or Firm* — Sughrue Mion, PLLC

(57) ABSTRACT

The invention concerns a process for hydroconversion of a hydrocarbonaceous feedstock comprising:
a preparation step of at least one catalyst in one or more preparation reactor upstream from a reaction section, wherein
(i) at least one preparation reactor feeds one or more reactor of the reaction section, or
(ii) preparation reactors are dedicated for catalysts fed to at least a hydroconversion reactor or at least a hydrotreatment reactor of the reaction section;
a separation step of solids contained in the liquid effluents issued from the reaction section,
a treatment step of residues issued from separation section, comprising a partial oxidation step wherein said residues are partially oxidized to produce carbon monoxide, hydrogen an a metal containing residue.
Such process permits improving of products quality, operation of the separation section, recovering of catalytic metals contained in the feed and supplying hydrogen to the reaction section.

20 Claims, 6 Drawing Sheets

(51) Int. Cl.
*C10G 49/02* (2006.01)
*C10G 49/04* (2006.01)
*C10G 49/12* (2006.01)
*C10G 65/02* (2006.01)
*C10G 67/12* (2006.01)
*B01J 23/85* (2006.01)

(52) U.S. Cl.
CPC ............... *C10G 49/04* (2013.01); *C10G 49/12* (2013.01); *C10G 65/02* (2013.01); *C10G 67/12* (2013.01); *B01J 2231/645* (2013.01); *B01J 2231/646* (2013.01); *B01J 2531/56* (2013.01); *B01J 2531/64* (2013.01); *B01J 2531/842* (2013.01); *C10G 2300/107* (2013.01); *C10G 2300/1011* (2013.01); *C10G 2300/1077* (2013.01); *C10G 2300/42* (2013.01); *C10G 2300/703* (2013.01)

(56) References Cited

U.S. PATENT DOCUMENTS

| | | | | |
|---|---|---|---|---|
| 4,770,764 | A | * | 9/1988 | Ohtake et al. ............... 208/73 |
| 4,824,821 | A | * | 4/1989 | Lopez et al. ................. 502/220 |
| 4,839,326 | A | | 6/1989 | Halbert et al. |
| 2006/0058175 | A1 | | 3/2006 | Chen et al. |
| 2009/0107881 | A1 | | 4/2009 | Lott et al. |

FOREIGN PATENT DOCUMENTS

| | | |
|---|---|---|
| JP | 59-172587 A | 9/1984 |
| JP | 60-71688 A | 4/1985 |
| WO | 2007/082117 A2 | 7/2007 |
| WO | WO 2009111871 A1 * | 9/2009 |

OTHER PUBLICATIONS

International Search Report [PCT/ISA/210] for PCT/EP2011/061282, dated Aug. 29, 2011.

E. Wolfrum et al., The Influence of Iron- and Sulphur-Containing Catalysts on the Hydroliquefaction of Lignite, Commission of the European Communities, pp. 63-84.

H. H. Oelert, et al., Laboratory Experiments on the Influence of Catalyst, Water Content and Reaction Gas Supply in the Hydrogenative Liquefaction of Coal, pp. 107-115.

Japanese Office Action dated Jul. 7, 2015 in counterpart JP Appl'n No. 2013-517352.

* cited by examiner

HYDROCONVERSION PROCESS FOR HEAVY HYDROCARBONACEOUS FEEDSTOCK

CROSS REFERENCE TO RELATED APPLICATIONS

This application is a National Stage of International Application No. PCT/EP2011/061282, filed on Jul. 5, 2011, which claims priority from European Patent Application No. 10 305 745.1, filed Jul. 6, 2010, the contents of all of which are incorporated herein by reference in their entirety.

The invention concerns a process for the conversion of a heavy hydrocarbonaceous feedstock.

More particularly, said process is dedicated to slurry hydroconversion of heavy feedstocks such as heavy petroleum fractions, coal, plastic waste materials or residues from natural origin.

As the price or shortage of crude oil increases, there is an increasing demand to find ways to better exploit these lower quality feedstocks and extract fuel values there from.

Catalytic processes for hydroconversion and refining of heavy hydrocarbon feed materials are already known. For example, U.S. Pat. No. 6,190,542 discloses a catalytic multi-stage hydrogenation process utilising two-staged dispersed catalyst reactors with successive primary and secondary interstage phase separators and a catalytic fixed bed in-line hydrotreater . . . . In this process, a heavy feed is fed as a slurry containing a highly dispersed iron-based catalyst into a first stage reactor and is reacted to break down the high molecular weight feed into lower molecular weight, lower sulfur and lower boiling hydrocarbon distillates and gases. Two inter-stage separators remove vapour and light liquid stream from the effluents issued from the first stage reactor. The liquid bottoms stream issued from the first inter-stage separator is fed to a lower pressure second stage catalytic reactor for further hydrocracking of the hydrocarbon liquid fraction in the presence of the highly dispersed iron based catalyst. Overhead vapour and light liquid fractions from effluents of the second stage reactor are combined with bottom stream issued from the second inter-stage separator and fed to the hydrotreating reactor containing a supported catalyst. The effluents issued from hydrotreating reactor are then separated, submitted to an atmospheric fractionation followed by a vacuum fractionation. Bottoms of the vacuum fractionation may be recycled back after solid-liquid separation.

The process according to the invention only uses non supported catalysts prepared in separated reactors from precursors.

There is a need to improve the quality of the products issued from such processes as well as to improve the operation of the separation section, to recover catalytic metals contained in the feed and supply hydrogen to the reaction section.

A first object of the invention is a process for the hydroconversion of a hydrocarbonaceous feedstock with an atomic H/C ratio of at least 0.25 in the presence of hydrogen and at least one catalyst in at least one reactor, said process comprising a reaction step performed in a reaction section comprising at least one reactor and a separation step performed in a separation section, characterised in that it comprises:

- a step of preparation of at least one catalyst in one or more preparation reactor upstream from the reaction section, wherein
  - (i) the at least one preparation reactor feeds one or more reactor of the reaction section, or
  - (ii) each preparation reactor is dedicated for catalysts fed to at least a hydroconversion reactor or at least a hydrotreatment reactor of the reaction section;
- a step of separation of the solids contained in the liquid effluents issued from the reaction section, said step being performed in a liquid/solid separation apparatus of the separation section,
- a step of treatment of the residues issued from the separation section, comprising a partial oxidation step performed in a partial oxidation section wherein said residues are partially oxidized to produce carbon monoxide, hydrogen and a metal containing residue.

Feedstock

Process according to the invention may be used to upgrade carbonaceous feedstocks comprising an atomic H/C ratio of at least 0.25.

Thus, various feedstocks can be upgraded through this process: atmospheric and vacuum residues, pitch coming from deasphalting, deasphalted oil, visbroken effluents (thermal cracking), shale oils, biomass ex-pyrolysis and ex-hydrothermal treatment, coal and, at least theoretically, petcoke from delayed coker.

Other feedstocks can also be coprocessed together with petroleum residue: tires, polymers, road bitumen.

General characteristics of feedstocks mentioned above are given hereafter in tables 1 to 10 (the data on the feedstocks are indicative as the origin of the crude and the processing conditions may lead to substantial differences in their analyses).

For some feedstocks, results of a typical simulated distillation are given.

Such a simulated distillation method is performed as follows:

Hydrocarbons are introduced in the column of a gas chromatography column and are separated with the increasing ebullating point. Temperature column is increased. Ebullating points are deducted from a calibrating curve, obtained in the same operating conditions with a known hydrocarbon mixture.

The column used is a Simdis HT 750 from Analytical Controls; length=5 m; Film=0.09 μm; Internal Diameter=0.53 mm (AC partno.: 24001.065). As calibration mixture the following may be used:

1. A C5-C28 mixture from Analytical Controls (AC partno.: 59.50.101A),
2. A C30-C120 mixture from Analytical Controls (Ac partno.: 59.50.100B).

IP means Initial Point distillation: temperature corresponding to a curve area of 0.5% of total chromatogram area.

FP means Final Point distillation: temperature corresponding to a curve area of 99.5% of total chromatogram area.

TABLE 1a

Shale oil typical characteristics

| Characteristic | Value observed | Unit |
| --- | --- | --- |
| gravity | 900-1076 | kg/m$^3$ |
| °API | 7.9-25 | |
| C | 78-86 | % wt |
| H | 7.5-12 | % wt |
| H/C | 1.2-1.7 | Atomic ratio |
| O | 0.7-7.5 | % wt |
| S | 0.5-7.5 | % wt |
| N | 0.1-2.5 | % wt |
| Arsine | 5.6-50 | ppm |
| Olefins (Bromine number) | 20-1260 | gBr$_2$/100 g |

TABLE 1b

Shale oil typical Simulated Distillation
Example of typical Simulated Distillation:

| IP | 80 | °C. |
|---|---|---|
| 10% wt | 200 | °C. |
| 20% wt | 250 | °C. |
| 50% wt | 400 | °C. |
| 70% wt | 450 | °C. |
| 90% wt | 560 | °C. |

Shale oils are impurities rich, some impurities being catalysts poisons, such as Arsine ($AsH_3$). Arsine is the worst poison of hydroprocessing catalyst (NiMo, CoMo). Alternative processes for shale oil refining are hampered by the presence of arsine, which poisons their catalytic functions. During hydrotreatment, arsine is deposed on the catalyst and trapped as nickel arsenide.

In the described process, fresh catalyst is continuously added, so that catalyst poisoning does not impact their process performances or the effluent qualities.

TABLE 2a typical characteristics of Atmospheric and Vacuum residue

| Characteristic | Value observed | Unit |
|---|---|---|
| gravity | 995-1030 | kg/m$^3$ |
| °API | 10.7; 5.8 | |
| C | 82-85 | % wt |
| H | 9-14 | % wt |
| H/C | 1.3-2 | Atomic ratio |
| S | 0.3-4 | % wt |
| Ni | 1-94 | ppm |
| V | 5-448 | ppm |
| Asphaltenes $C_7$ (ASTM D6560) | 2-20 | % wt |

TABLE 2b typical simulated distillation of Atmospheric and Vacuum residues
Example of typical Simulated Distillation:

| IP | 433 | °C. |
|---|---|---|
| 10% wt | 544 | °C. |
| 20% wt | 576 | °C. |
| 50% wt | 636 | °C. |
| 70% wt | 688 | °C. |
| FP 88% wt | 748 | °C. |

TABLE 3a typical characteristics of Pitch

| Characteristic | Value observed | Unit |
|---|---|---|
| Deasphalting solvent | $C_3$ to $C_5$ | — |
| Gravity | 1.1-1.2 to solid | t/m$^3$ |
| Conradson Carbon | 50 | % wt |
| Sulfur | 6.5 | % wt |

TABLE 3b typical Simulated Distillation of Pitch
Example of typical Simulated Distillation:

| 1% wt | 222 | °C. |
|---|---|---|
| 10% wt | 310 | °C. |
| 30% wt | 590 | °C. |
| 50% wt | 682 | °C. |
| FP 57% wt | 740 | °C. |

TABLE 4a typical characteristics of Deasphalted oil

| Characteristic | Value observed | Unit |
|---|---|---|
| Deasphalting solvent | $C_3$ to $C_5$ | — |
| Gravity | 0.970-1.025 | t/m$^3$ |
| Conradson Carbon | 7-22 | % wt |
| Sulfur | 1-5 | % wt |
| Asphaltenes $C_7$ | <0.05-3 | % wt |

TABLE 4b typical Simulated Distillation of Deasphalted oil
Example of typical Simulated Distillation:

| IP | 371 | °C. |
|---|---|---|
| 10% wt | 513 | °C. |
| 20% wt | 543 | °C. |
| 50% wt | 603 | °C. |
| 70% wt | 643 | °C. |
| FP 95% wt | 741 | °C. |

TABLE 5a typical characteristics of Visbroken residue:

| Characteristic | Value observed | Unit |
|---|---|---|
| Gravity | 995-1080 | kg/m$^3$ |
| Conradson Carbon | 22-33 | % wt |

TABLE 5b typical Simulated Distillation of Visbroken residue:
Example of typical Simulated Distillation:

| IP | 384 | °C. |
|---|---|---|
| 10% wt | 496 | °C. |
| 20% wt | 536 | °C. |
| 50% wt | 613 | °C. |
| 70% wt | 680 | °C. |
| FP 82% wt | 748 | °C. |

TABLE 6 typical characteristics of Polymers:

| Elemental composition (dry basis) | Value observed | unit |
|---|---|---|
| C | 40-96 | % wt |
| H | 3-4 | % wt |
| H/C | 0.38-1.20 | Atomic ratio |
| O | 0-50 | % wt |

TABLE 7 typical characteristics of Petcoke:

| Elemental composition (dry basis) | Value observed | unit |
|---|---|---|
| C | 86-88 | % wt |
| H | 3-4 | % wt |
| H/C | 0.41-0.56 | Atomic ratio |
| N | 1 | % wt |
| S | 7.5 | % wt |
| Ni + V | 750 | ppm |

TABLE 8 typical characteristics of Pyrolysis Bio-oil

| Characteristic | Value observed | Unit |
|---|---|---|
| Moisture content | 15-30 | % wt |
| Elemental composition (dry basis): | | |
| C | 54-58 | % wt |
| H | 5-8 | % wt |
| H/C | 1.03-1.78 | Atomic ratio |
| N | 0-0.2 | % wt |
| O | 35-40 | % wt |
| Solids | 0.2-1 | % wt |

TABLE 9 typical characteristics of Slurry from pyrolysis bio-oil, usually sent to gasification

| Characteristic | Value observed | Unit |
|---|---|---|
| Moisture content | 9-18 | % wt |
| Elemental composition (dry basis): | | |
| C | 72-75 | % wt |
| H | 3-5 | % wt |
| H/C | 0.48-0.83 | Atomic ratio |
| O | 20-25 | % wt |
| Coke particles | 40 | % wt |

TABLE 10 typical characteristics of Bio-oil ex hydrothermal conversion:

| Characteristic | Value observed | Unit |
|---|---|---|
| Moisture content | 9 | % wt |
| Elemental composition (dry basis): | | |
| C | 73.7 | % wt |
| H | 7.6 | % wt |
| H/C | 1.24 | Atomic ratio |
| O | 15.3 | % wt |
| N | 3.3 | % wt |

Preparation Section

The preparation section is dedicated to the preparation of the at least one catalyst to be used in the reaction section.

Each catalyst is prepared in a reactor by activation of a catalytic precursor in a stirred batch.

Advantageously, each catalyst is prepared in at least two preparation reactors. The reactors of the reaction section can then be continuously fed with the catalyst.

The catalytic precursor is for example injected in the stirred batch, together with a sulfiding agent in order to form the activated catalyst. Sulfiding agent may be for example DMSO (dimethylsulfoxide), DMDS (dimethyldisulfide), elemental sulfur or $H_2S$, pure or in mixtures coming from refinery sources.

Catalytic precursor activation (conversion of precursor to active sulfur specie of the metal contained in the precursor) may be achieved in dedicated vessels.

The mixture is heated under programmable operating conditions (temperature, pressure, concentration of sulfidation agent, residence time).

Preferably, a hycrocarbonaceous feedstock (which can be same or different from feedstock treated in the reaction section) is mixed with the catalyst precursor, and eventually with other additives, under appropriate concentrations depending on the type of feedstock.

The feedstock thus introduced in the preparation reactor will advantageously be heated before, in order to reduce its viscosity. It is then mixed together with a catalyst precursor.

If the feedstock contains enough elemental sulfur or enough or any other sulfiding agent, adding a specific sulfiding agent may be avoided.

Alternatively, feedstock may be mixed with the active catalyst in a further dedicated reactor different from the preparation reactor.

Preferably, hydrogen (or a mixture of hydrogen and $H_2S$) is added to each preparation reactor. Such addition of hydrogen helps to control the activity of the very active sulfur specie of the activated catalyst such that coking of the catalyst is reduced or avoided.

In order to improve additive dispersion and to limit foaming, crushed solids or other additives (dispersing agents . . . ) can be added (example crushed coke, 2% wt, granulometry 300 to 500 microns; alumina; thiosilicates; sulfonates of calcium carbonate; as well as any other suitable additive as those described in U.S. Pat. No. 5,594,945).

The catalytic precursor is added under different concentration, depending on the type (octoate, naphtenate, metallocene, oxide . . . ).

Metals active under their sulfated state for hydroprocessing are added under concentrations of 10 to 100000 ppm (weight ratio of transition metal to the feedstock), preferably from 100 to 10000 ppm, more preferably from 200 to 1000 ppm.

Metals active for hydroprocessing are preferably: Mo, Ni, Co, W, Cr, V, Fe.

Catalytic precursor can be added under several forms: water soluble, oil soluble or finely powdered solid.

Catalytic precursor activation can be achieved in dedicated vessels.

Depending on the catalytic additive type and composition and on the (heavy) feedstock to treat, activation operating conditions to apply are different: temperature (including sometimes stages), pressure, sulfiding agent ratio, stirring.

To allow more flexibility, preparation reactors may be dedicated to catalytic precursor activation. Thus, advantageously, continuous feed to a reactor of the reaction section can be achieved and, what is more, the catalyst preparation reactors can feed different catalytic systems to the reactors of the reaction section.

Two (or more) such vessels can be disposed in parallel, so that two different catalytic precursors can be activated. That way, the hydroprocessing can benefit the synergy effect of different catalytic systems.

Moreover, different catalytic systems can be added to different reactors of the reaction section.

For example, at least one preparation reactor may feed one or more reactor of the reaction section.

Alternatively, each preparation reactor may be dedicated for catalysts fed to at least a hydroconversion reactor or at least a hydrotreatment reactor of the reaction section.

By hydroconversion is meant the breakage of bonds in the molecules of hydrocarbons under hydrogen atmosphere in order to decrease or suppress coke and gas (C1-C4) formation. The breakage of bonds itself is mainly driven by temperature, the catalyst being used to promote hydrogen incorporation into the products. The term hydroconversion is used to differentiate from "hydrocracking" where the breakage of bonds is promoted by the catalyst.

Catalysts for hydroconversion processes are based on metals from Group IIA, IIIB, IVB, VB, VIIB, VIIB, VIII, IB and IIB.

By hydrotreatment is meant the removal of contaminants like sulfur, nitrogen, oxygen, metals, CCR (Conradson Carbon Residue), . . . , from a hydrocarbon stream under hydrogen atmosphere. Catalysts for hydrotreatment are the same as for hydroconversion, however with a preference, thanks to their higher activity, for metals of groups VB and VIB promoted or not with metals from group VIII.

Hydroconversion will preferably be performed before hydrotreatment, although hydrotreatment may precede hydroconversion.

Advantageously, catalyst(s) dedicated to hydroconversion contain one transition metal selected from group VB, VIB, VIII, in an active state, and catalyst(s) dedicated to hydrotreatement contain two transition metals in an active state, one transition metal being selected from group VB, VIB, VIII and another transition metal being selected from group VIII.

Catalyst(s) dedicated to hydroconversion may contain V, Mo or Fe and catalyst(s) dedicated to hydrotreatement may contain Mo—Ni, or Mo—V, or Fe—Ni.

Different catalyst precursors may be used for each catalyst.

Catalysts precursors may be selected from naphtenates, octoates ($(C_7H_{15}\text{—COO})_xM$, where M is the metal and $3<x<5$), and oxides.

For example, precursors containing Mo will be naphtenates, precursors containing Ni will be octoate, such as 2-ethyl hexanoate, and precursors containing V will be acetylacetonate or acetoacetonate.

Alternatively, a precursor of monometallic catalyst may also be an organometallic coordination compound of formula $C_1C_2ML_n$ (I), where M is a transition metal selected from group IIA, IIIB, IVB, VB, VIIB, VIIB, VIII, IB or IIB of the periodic table of elements, —$C_1$ and —$C_2$ are monocyclic or polycyclic aryl hydrocarbon ligands that are pi-bonded to M, or monocyclic or polycyclic polyenes ligand pi-bonded to M, —$C_1$ and —$C_2$ being the same or different, each of —$C_1$ or —$C_2$ comprising from 0 to 5 substituents R, each substituent R being the same or different, R being selected from:
- a C3-C8 substituted or unsubstituted, monocyclic or polycyclic ring structure that is partially unsaturated, unsaturated or aromatic, fused or not fused to the ligand —$C_1$ or —$C_2$,
- a C3-C8 substituted or unsubstituted, partially unsaturated or unsaturated, linear or branched, alicyclic hydrocarbyl radical,
- a C1-C8, substituted or unsubstituted, linear or branched, saturated hydrocarbyl radical, —$C_1$ and —$C_2$ being independent or connected via at least one substituent R, -L is a ligand that is sigma-bonded to M, n is an integer equal to 0 to 3, each -L is, independently, a univalent ligand.

A fused ring is a ring having two carbon atoms and one bond in common with another ring.

Advantageously, in formula $C_1C_2ML_n$, each of $C_1$ or $C_2$ is a C5-C8 monocyclic polyene ligand comprising from 0 to 5 substituents R, each substituent R being the same of different, R being defined as above.

Polyenes are poly-unsaturated organic compounds that contain one or more sequences of alternating double and single carbon-carbon bonds.

For example, each of $C_1$ or $C_2$ may be substituted or unsubstituted cyclopentadiene. The substituents may be the same as substituents R described above.

Advantageously, the organometallic coordination compound is a metallocene compound presenting the general formula (II) below

(II)

Where the R substituted or unsubstituted cyclopentadienyl ligands are pi-bonded to M, and L ligands are sigma-bonded to M, and where M, L, R and n are defined as in formula (I).

Thus, metallocene compounds consist of two cyclopentadienyl anions (substituted or not) bound to a metal center in a "sandwich" structure.

Advantageously, in the formulas (I) or (II), M is selected from Group IIA, IIB, IIIB, IVB, VB, VIIB, VIIB or VIII of the periodic table of the elements, preferably M is selected from Fe, V or Mo.

Advantageously, in the formulas (I) or (II), the ligand -L is selected from:
  Hydrides (-L=—H)
  Halides (-L=—F, —Cl, —Br, —I)
  "Pseudo-halides" (-L=—CN (cyanide))
  Alkoxide (-L=—OR)
    Thiolate (-L=—SR)

Amide (-L=—NR$_2$)
    Phosphide (-L=—PR$_2$)
-L=-ER$_3$ or -EX$_3$ (with E=Si, Ge, Sn;)
Alkyl (-L=—CH$_2$R or other)
    Alkenyl (-L=—CHCHR)
    Alkynyl (-L=—CCR)
Acyl (-L=—COR)
Isocyanide (-L=—CNR)
    Nitrosyl (-L=—NO)
    Diazenide (-L=—NNR)
    Imide (-L==NR)
-L=—PR$_3$, —PX$_3$, —AsR$_3$, —SbR$_3$ and amines
-L=ER$_2$ (with E=O, S, Se, Te)

Where X is a halogen atom and R is a C1-C8, preferably a C1-C6, linear or branched, alkyl, alkenyl Group or a C3-C8 alicyclic or aromatic group.

The catalytic precursor is added under different concentration, depending on the type (octoate, naphtenate, metallocene, oxide . . . ) and under several forms: water soluble, oil soluble or finely powdered solid.

The oil-soluble metal precursors are available either as pure solids (metallocenes) or as solutions in hydrocarbons.

In the pure oil-soluble solid precursors, the metal content is known from the atomic weight of the metal and the molecular weight of the precursor molecule. The amount of precursor to add to the feedstock in order to obtain a given metal concentration in the feedstock can thus be calculated.

The solutions of oil-soluble precursors in hydrocarbons are analyzed on their metal content. The amount of solution to be added to the feedstock in order to obtain a given metal concentration in the feedstock can thus be calculated.

Reaction Section

Reaction section may contain one or more reactors in series for hydroprocessing of the feedstock.

Preferably, at least two reactors are used.

Each reactor can operate in upflow or down flow reactor. These reactors are preferably perfectly stirred reactors (CTSR).

Hydrogen may be added upstream of each of reactor.

Each reactor is fed with at least one slurry issued from a preparation reactor.

The slurry, consisting of feedstock containing activated catalyst, hydrogen and eventually other additives, and additional hydrogen if needed, is pressurized and enters the reaction section.

Preferably, the slurry is preheated before pressurization.

In one variant, the reaction section comprises a hydroconversion reactor and a hydrotreatment reactor.

The hydroconversion reactor is preferably maintained at a temperature from 360 to 480° C., preferably from 400 to 440°, and under a pressure of 50 to 300 b, preferably from 100 to 200 b.

The hydrotreatment stage (HT2: 50) is preferably maintained at a temperature from 360 to 480° C., preferably from 380 to 440°, and under a pressure 50 to 300 b, preferably from 100 to 200 b.

Separation Section

This section is intended to the treatment of liquid effluents issued from the reaction section.

The separation section will advantageously comprise atmospheric fractionation followed by vacuum fractionation.

Preferably, the liquid effluents issued from the reaction section are flashed in order to remove gases before being sent to atmospheric fractionation. These gases contain hydrocarbons, H$_2$ and H$_2$S. After hydrocarbons removal, the H$_2$ and H$_2$S containing stream can be recycled: H$_2$ for process consumption and H$_2$S for catalytic precursor activation.

Atmospheric fractionation and vacuum fractionation can be performed using conventional distillation column or by thin film evaporator technologies.

The atmospheric fractionation bottom is sent to vacuum fractionation.

A part of this atmospheric fractionation bottom may also be partly recycled back to one or several reactors of the reaction section.

The vacuum fractionation bottom can be partly or totally recycled back to at least one of the reactors of the reaction section.

Advantageously, the vacuum fractionation bottom is partly or totally recycled back to a reactor with milder operating conditions or with a specific catalyst. This can be particularly advantageous as vacuum bottom, which already passed through the reaction section, might be more difficult and/or specific to convert.

Preferably, the vacuum fractionation bottom is partly or totally recycled back to a hydrotreatment reactor, located downstream of a hydroconversion reactor of the reaction section.

Gaseous overhead of atmospheric fractionation and/or of vacuum fractionation may also be recycled back to one or several of the reactors of the reaction section.

Separation of the Solids Contained in the Liquid Effluents Issued from the Reaction Section Liquid effluents issued from the reaction section contain solids (catalyst, ore, coke, sediments). These solids may contribute to plugging during operation and materiel deterioration.

These solids including catalyst, additive, or sediments/coke can be removed using a liquid/solid separation.

Different separations can be used: filters, membranes or centrifuges.

Filters size will be chosen depending on the catalytic precursor and additives added.

According to the invention, a liquid/solid separation apparatus is provided in the separation section.

As mentioned above, the separation section preferably comprises an atmospheric fractionation followed by a vacuum fractionation.

In a first variant, the liquid/solid separation apparatus will be placed downstream of the vacuum fractionation, for separating the solids contained in the vacuum residue. This variant is although not preferred as the vacuum residue (called flakes) is viscous and has a density close to the solids to remove. Membranes and filters may be subject to plugging. Centrifuges may not be very efficient as their efficiency increases with density differential between the two elements to separate.

Advantageously, this solid-liquid separation will be placed upstream of fractionation, the filtration being performed with a less viscous and less dense liquid fraction.

In one variant, the liquid/solid separation apparatus will be placed upstream of the atmospheric fractionation.

Preferably, the liquid/solid separation apparatus then treats a flashed effluent, downstream of a flash vessel.

In another variant, the liquid/solid separation apparatus will be places upstream of the vacuum fractionation, for filtration of the atmospheric residue.

Liquid issued from liquid/solid separation apparatus is solid free, or solid poor according to separation efficiency (or filter porosity).

Advantageously, the liquid/solid separation apparatus is a multi stage filter, for example with a first stage retaining particles of size superior or equal to 100 microns and a second stage retaining fine particles of size superior or equal to 10 microns.

Treatment of Residues Issued from the Separation Section

Flakes are the final residues of slurry processing. They are frequently very heavy residues which contain high boiling point species and most of the metals which were present in initial crude feedstock. Flakes also contain spent slurry catalyst which generally consists of metal chalcogenide species, the metal being typically molybdenum, tungsten or iron.

For all these reasons, flakes are a concern for slurry hydroconversion processes. Flakes are mostly burnt for heat production.

Hydrogen consumption is critical in a slurry plant. Lack of hydrogen always results in poorly converted residues and low quality products.

It has now been found that flakes valorization can be optimized using a gasification/partial oxidation process (POX).

Gasification/partial oxidation process first leads to metal recovery (catalyst and metals contained in the feedstock) and second to hydrogen generation. Gasification/partial oxidation allows catalyst recovery, together with residual Nickel and Vanadium or other valuable metals contained in the feedstock.

Gasification/partial oxidation results in syngas production that will advantageously generate hydrogen to partially feed the highly hydrogen-consuming hydroconversion process. Hydrocarbon load (slurry flakes) is burnt in dedicated furnaces in the presence of water and oxygen at ca. 1300° C. to produce hydrogen and carbon monoxide.

The gasification/POX unit can be dedicated to the slurry hydroconversion process or shared with an existing unit (co-feeding).

POX units running on liquid feedstock (ex: straight run vacuum residues, visbroken vacuum residues) can manage solids mixed together with the feedstock (or solved in the feedstock).

Advantageously, in the process of the invention, the step of treatment of residues comprises, after partial oxidation, a step for recovering the metals originally contained in the catalyst and/or the feedstock.

Thus recovered metals may for example be used to produce fresh metal containing catalyst.

Preferably, such step for recovering the metals successively undergoes (i) calcination to remove carbon containing material, (ii) washing with water, (iii) acidification with sulfuric acid to obtain an acidic water and a first precipitate which is separated, (iv) alkalinization of said acidic water with sodium hydroxide to obtain an alkaline water and a second precipitate which is separated.

Preferably, said calcination is performed so as to collect carbon monoxide and hydrogen.

Advantageously, $(FeCl(SO_4))$ is added at steps (iii) and (iv).

Preferably, the method for recycling undergoes a further step (v) wherein alkaline water is further neutralized with an acid.

Vanadium pentoxide $(V_2O_5)$ and iron-molybdenum-nickel alloy can be obtained by introduction of first and/or second precipitate of steps (iii) (iv) into melted iron.

An embodiment of this recycling method is detailed below.

After being cooled at the outlet of the gasification reactors, the raw gas is scrubbed with circulating water to remove the soot. A soot treatment unit extracts the soot, which are recycled (co-feed or solvent) from the waste water.

The waste water stream contains all the metals and heavy metals particles, such as Vanadium, Nickel, Sulfur, oxidizable substances and the catalytic metals.

Waste water undergoes a two step chemical demetallizing treatment of reaction-precipitation-separation, respectively at acidic and alkaline pH with addition of flocculation additives. A mixed V/Ni-sludge optionally containing catalytic metals is recovered in a sludge buffer tank. The sludge is then dewatered to residual moisture of 25-35% by mean of a filtration to obtain a cake. Such a waste water processing method is described below in details with respect to FIG. 5.

Resulting cake is further dried if pyrometallurgical metal recycling is chosen. In this case, cakes are loaded into molten iron to obtain reduced iron-molybdenum-nickel alloy that is valuable to steel manufacturers, and an upper layer constituted of divanadium pentoxyde $(V_2O_5)$ which is removed. $V_2O_5$ can be processed using standard metallurgy to obtain vanadium-iron alloys or pure vanadium, depending on refining method and expected product specification.

Hydrometallurgical and electrochemical methods may also be useful for the isolation of metal constituents of the cake. Methods described by M. Marafi and A. Stanislaus in *Resources, Conservation and Recycling* 53 (2008), 1-26 and references cited therein are suitable for this purpose. The aforesaid document and references cited therein are hereby incorporated by reference.

Molybdenum and nickel, or molybdenum and vanadium may be used as sulfides for slurry hydroconversion and/or hydrotreatment. These combinations may have advantages in term of e.g. desulfuration or arsenic removal within the slurry process, depending on the feedstock. In this respect, one can use crude cakes and remove only one of nickel and vanadium and make an adjustment in the remaining element, namely molybdenum Pure Molybdenum oxide, iron oxide or tungsten oxide may be used for the preparation of the slurry catalyst. Alternatively, other Mo, Fe or W sources may be used which would enhance solubility of metal species in liquid hydrocarbon media such as crude oil. For instance, dicyclopentadienyl iron or dicyclopentadienyl molybdenum dichloride is suitable for the preparation of finely dispersed iron sulfide or molybdenum sulfide.

Usually, soluble metal species are sulfided using elemental sulfur or $H_2S$ or any suitable sulfur source such as dimethyldisulfide (DMDS), diethyldisulfide (DEDS) or a mercaptide such as methyl mercaptan or ethyl mercaptan.

Advantageously, catalysts may be prepared using $H_2S$ containing gas issued from a refinery stream such as (i) fuel gas or (ii) $H_2S$ rich gas which is dedicated to the feeding of sulfur recovery units (SRU) (e.g. Claus units).

In any case, it is desired that sulfidation of homogenous metal species in organic or aqueous media results in finely divided metal sulfide particles with a defined granulometry. Granulometry can be adjusted by varying stirring, reaction vessel temperature and sulfidation reactant or metal species introduction rate.

In case of ore catalyst (e.g. $MoS_2$=molybdenite), granulometry is comprised between 10 to 500 microns, preferably 100 to 200 microns. Concentration is up to 1% wt when slurry reactor is in operation.

In case of liposoluble or hydrosoluble precursor (e.g. dicyclopentadienyl molybdenum dichloride or dicyclopentadienyl iron), concentration of respectively prepared molybdenum sulfide ($MoS_2$) and iron sulfide (FeS) in the slurry reactor in operation is up to 1000 ppm, preferably between 100 and 300 ppm.

The invention is now described with reference to appended FIGS. 1-5, which depict non-limitative methods for upgrading a heavy feedstock and for recycling metals contained in a metal containing residue issued there from.

Figure 8:
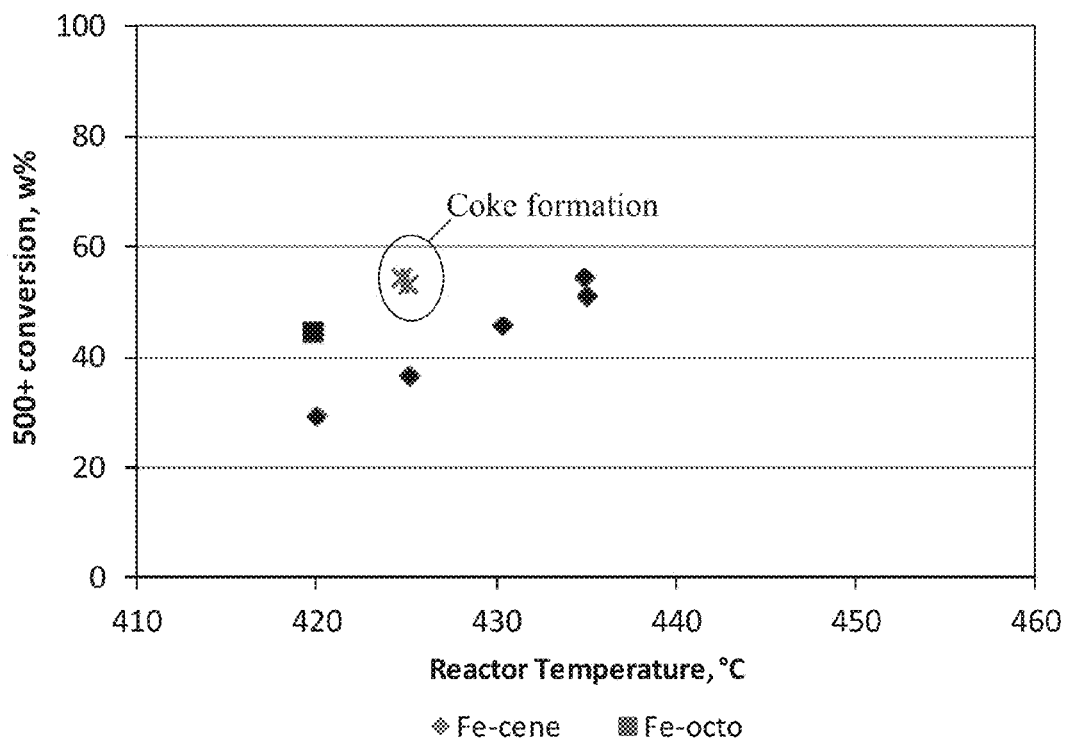

FIG. 8 represents the conversion of the 500+ fraction as a function of the reactor temperature with two oil-soluble iron catalyst precursors: ferrocene (Fe-cene) and iron octoate (Fe-octo). Conditions tested (example 2): reaction time=1 h; catalyst concentration=5000 wppm metal. Crosses (x) indicate runs where coke formation occurred.

Figure 9:
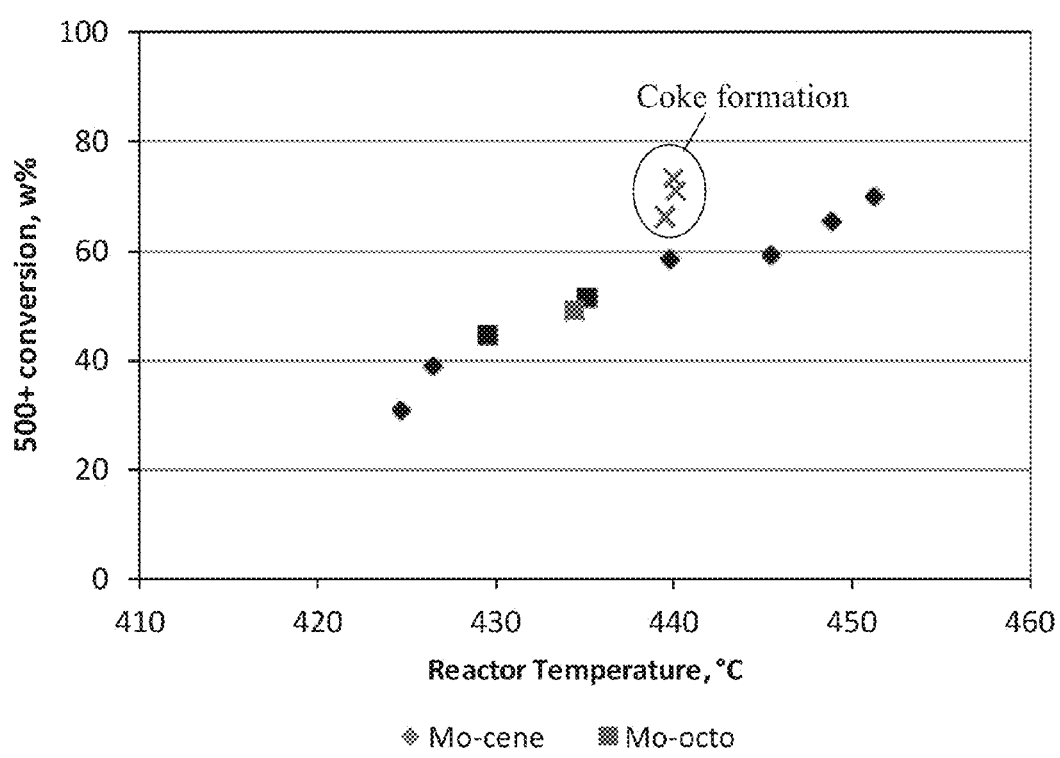

FIG. 9 represents the conversion of the 500+ fraction as a function of the reactor temperature with two oil-soluble molybdenum catalyst precursors: molybdenocene (Mo-cene) and molybdenum octoate (Mo-octo). Conditions tested (example 3): reaction time=1 h; catalyst concentration=5000 wppm metal. Crosses (x) indicate runs where coke formation occurred.

The process of the invention, which is more particularly dedicated to heavy feedstocks, consists in several sections: a preparation section wherein additive and feedstock are prepared, a reaction section, a separation section. Each section can be made of different units:

Preparation section may comprise: precursor activation, hydrogen addition, catalyst and feedstock mixture, heating;

Reaction section may comprise one or more reactors in series (not limited);

Separation section may comprise separators, atmospheric fractionation, and vacuum fractionation.

Detailed description will be made with reference to FIG. 1.

Figure 1:
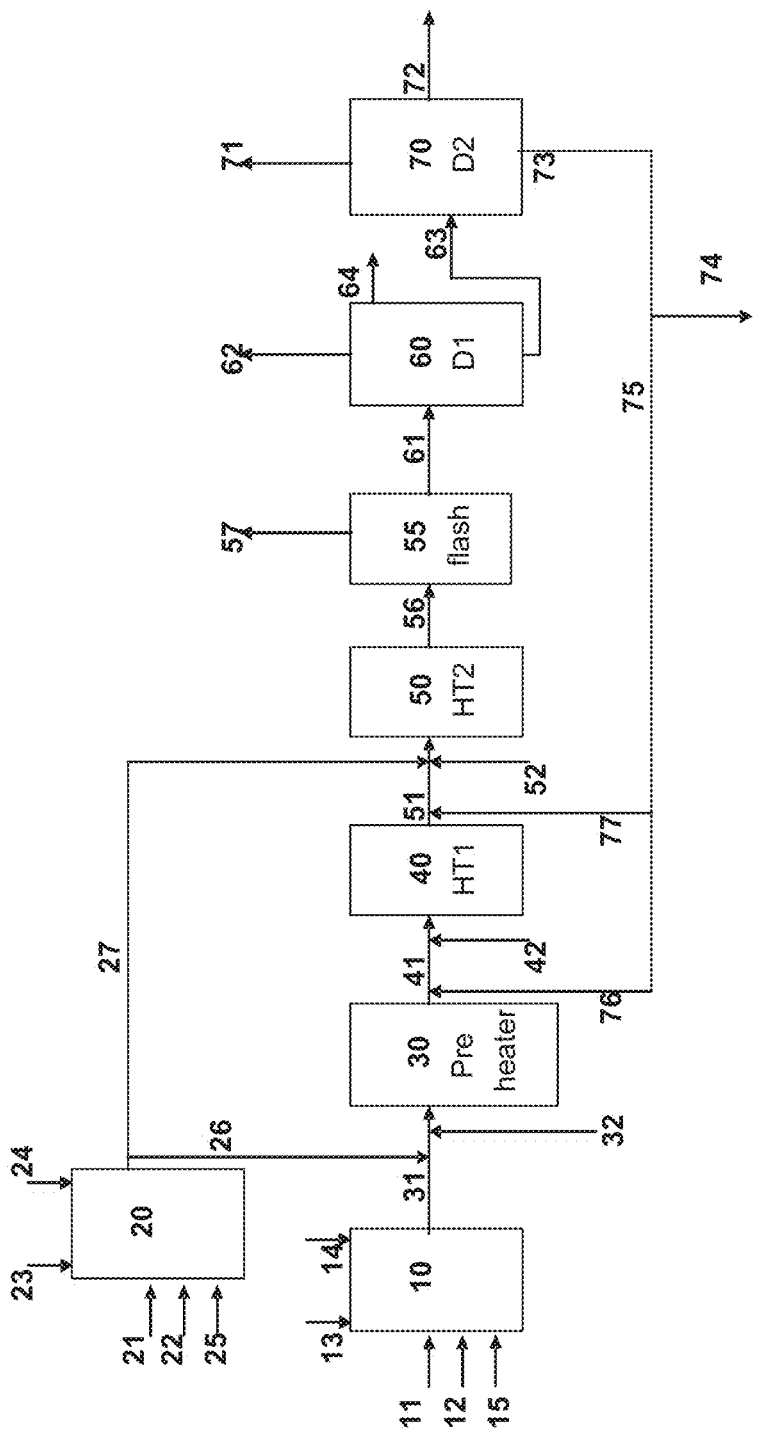
FIG. 1 is a schematic representation of a first embodiment of the process of the invention.

In the example represented FIG. 1, the preparation section comprises two preparation reactors 10 and 20.

Each preparation reactor 10, 20 is fed with feedstock 11, 21 respectively.

As already mentioned this feedstock can be the same or different for each preparation reactor and this feedstock may be the same as the feedstock to treat or may be a liquid hydrocarbon, for example used as solvent.

Hydrogen $H_2$ 12, 22, or a mixture of hydrogen and $H_2S$, is also fed to preparation reactors 10, 20 respectively.

Each of the preparation reactor 10, 20 is fed respectively, with a catalyst precursor 13, 23 respectively, which can be the same or different. Catalyst precursor can be in several forms: water soluble, oil soluble or finely powdered solid.

For activation of the catalyst precursor in each preparation reactor 10, 20, a sulfiding agent 15, 25, respectively, may be added (DMDS, DMSO, $H_2S$, elemental sulfur, . . . ) as represented on FIG. 1. Addition of a sulfiding agent may not be necessary if the feedstock added contains enough sulfur.

In order to improve catalyst precursor dispersion inside each preparation reactor 10, 20, crushed solids or other additives 14, 24 can be added (such as crushed coke, 2% wt, granulometry 300 to 500 microns).

Preparation section also comprises a pre-heater 30 for heating the slurry 31 issued from preparation reactor 10 or the slurry 26 issued from preparation reactor 20.

At least a part of the feedstock to treat 32 may also be introduced upstream from the pre-heater 30.

The heated slurry 41 issued from pre-heater 30 is conducted to the reaction section.

Reaction section comprises in the example two hydroprocessing reactors 40 and 50 in series for hydroprocessing steps HT1 and HT2 respectively, the effluents 51 issued from reactor 40 being fed to reactor 50.

If needed, additional hydrogen 42, 52 may be added upstream of each hydroprocessing reactor 40, 50 respectively.

As represented, the slurry 27 issued from one of the preparation reactors (20 in the example) can feed the second hydroprocessing reactor 50.

The effluents 56 issued from reaction section are then treated in the separation section.

In the separation section, the effluents 56 are flashed in a dedicated vessel 55 in order to remove gases 57.

Separation section also comprises an atmospheric fractionation D1 followed by a vacuum fractionation D2.

Liquid effluents 61 obtained are conducted to an atmospheric fractionation apparatus 60. Atmospheric fractionation overhead 62 is condensed and recovered. Atmospheric fractionation bottom 63 is sent to a vacuum fractionation apparatus 70. Other products 64 from the atmospheric fractionation are recovered (not represented in FIGS. 2-4).

Vacuum fractionation overhead 71 is condensed and recovered.

Vacuum fractionation bottom 73 may be sent to purge via line 74 or can be partially or totally recycled back to the first reactor 40 via line 76 or to the second reactor 50 via line 77.

Other products 72 from the vacuum fractionation are recovered.

The separation section also comprises a solid-liquid separation apparatus 80 (represented on FIGS. 2-4) for removing solids from streams circulating in the separation section. These solids include catalyst, additive, or sediments/coke.

Different separations can be used: filters, membranes or centrifuges.

Filters size depend on the catalytic precursor (stream 13 and 23) and additive added (stream 14 and 24).

Figure 2:
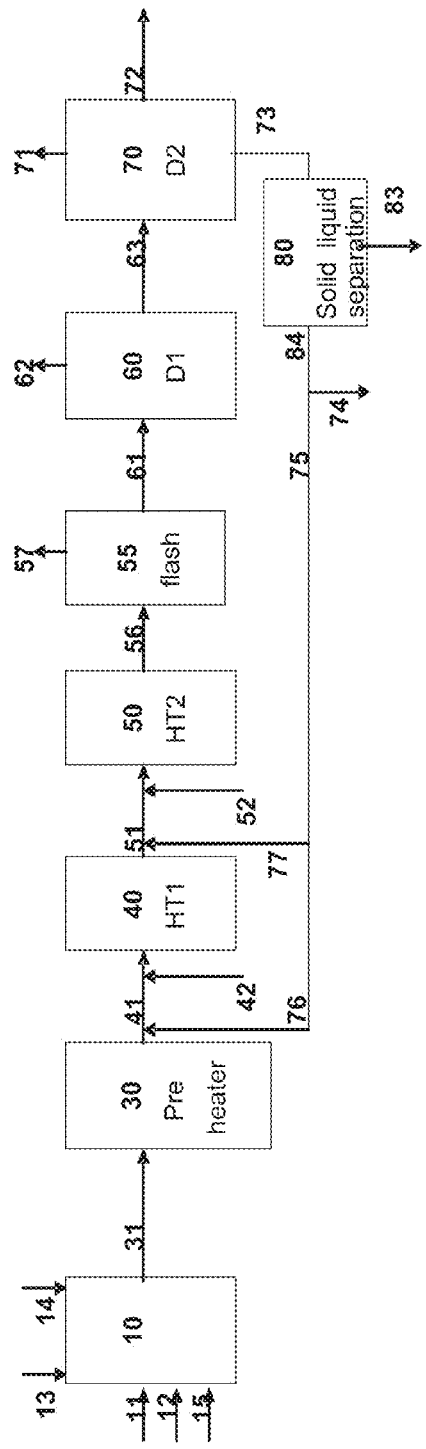
FIG. 2 is a schematic representation of a second embodiment of the process of the invention.
Figure 3:
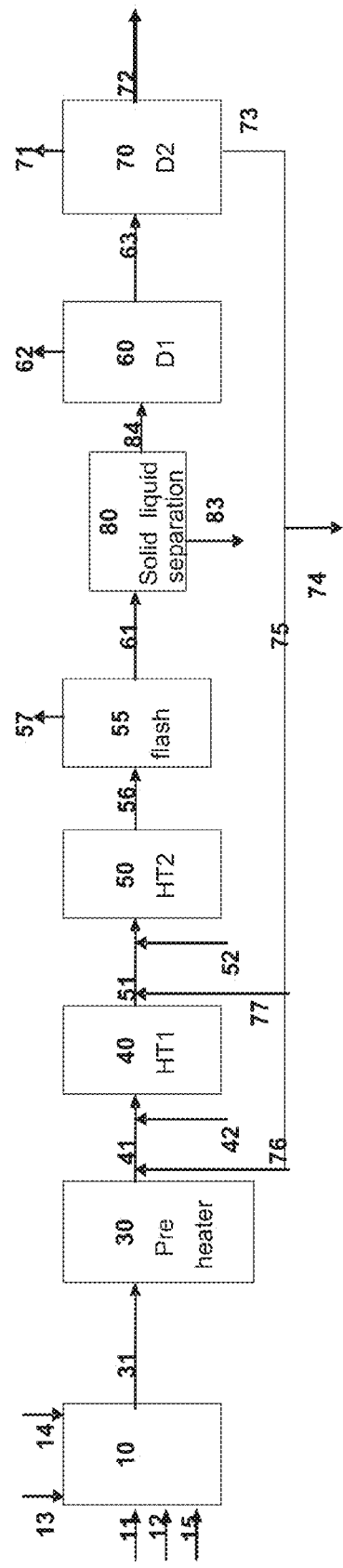
FIG. 3 is a schematic representation of a third embodiment of the process of the invention
Figure 4:
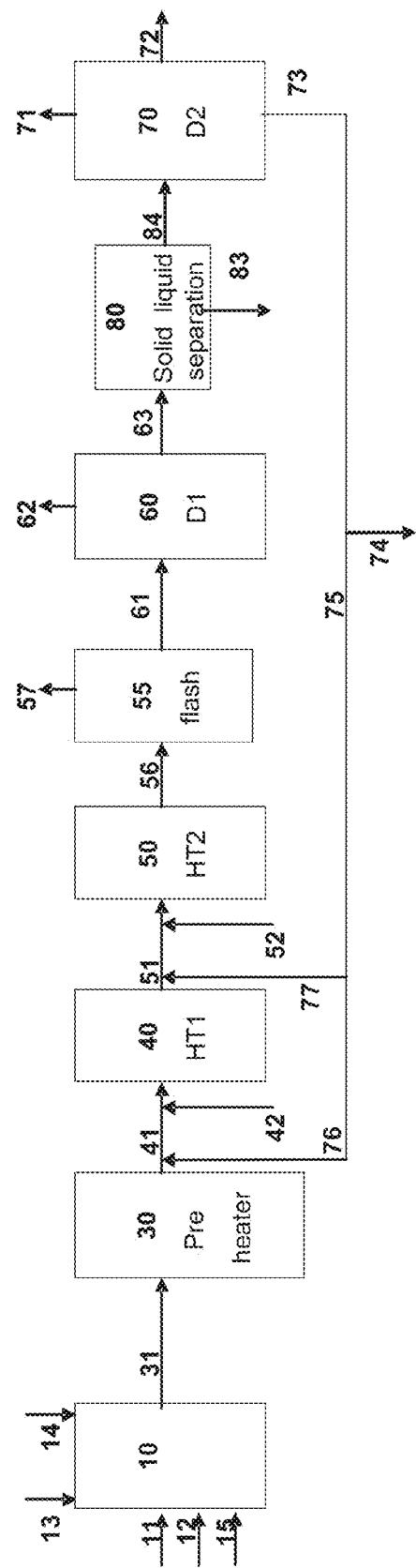
FIG. 4 is a schematic representation of a fourth embodiment of the process of the invention.

FIGS. 2, 3 and 4 differ from each other only by the position of the solid-liquid separation apparatus 80.

In FIG. 2, the solid-liquid separation apparatus 80 is placed downstream of the vacuum fractionation for separation of solids contained in the vacuum fractionation bottom 73. It is preferably placed upstream from purge 74 or from recycles 76, 77.

In FIG. 3, the solid-liquid separation apparatus 80 is placed upstream from atmospheric fractionation 60 and downstream of the flash vessel 55 for separation of solids contained in the liquid effluents 61.

In FIG. 4, the solid-liquid separation apparatus 80 is placed upstream from vacuum fractionation 70 and downstream from atmospheric fractionation 60 for separation of solids contained in the atmospheric fractionation bottom 63.

In all embodiments, solids issued from separation apparatus 80 are recovered on stream 83, stream 84 being the liquid solid free or solid poor according to separation efficiency (or filter porosity).

The solids recovered on stream 83 are treated in a POX unit, in which they are burnt at 1300° C. in the presence of water and oxygen to produce carbon monoxide, hydrogen and a metal containing residue.

This metal containing residue is collected and calcinated to remove carbon containing material. The resulting gas is scrubbed with circulating water to remove soot.

Figure 5:
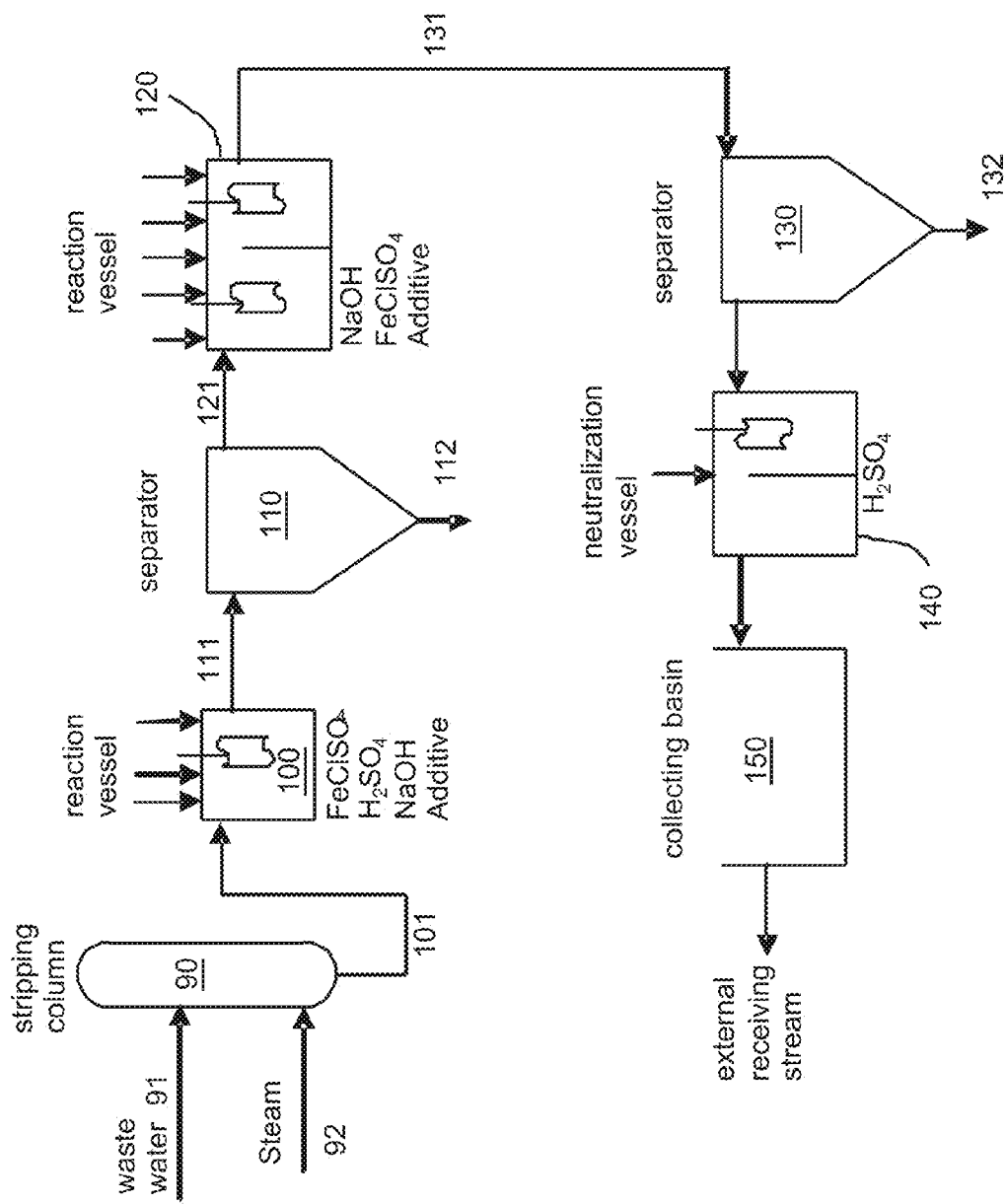
FIG. 5 represents a waste water treatment unit for recycling metals contained in waste waters issued from gasification/partial oxidation process of a metal containing residue issued from a slurry unit as depicted in FIG. 1.
Figure 6:
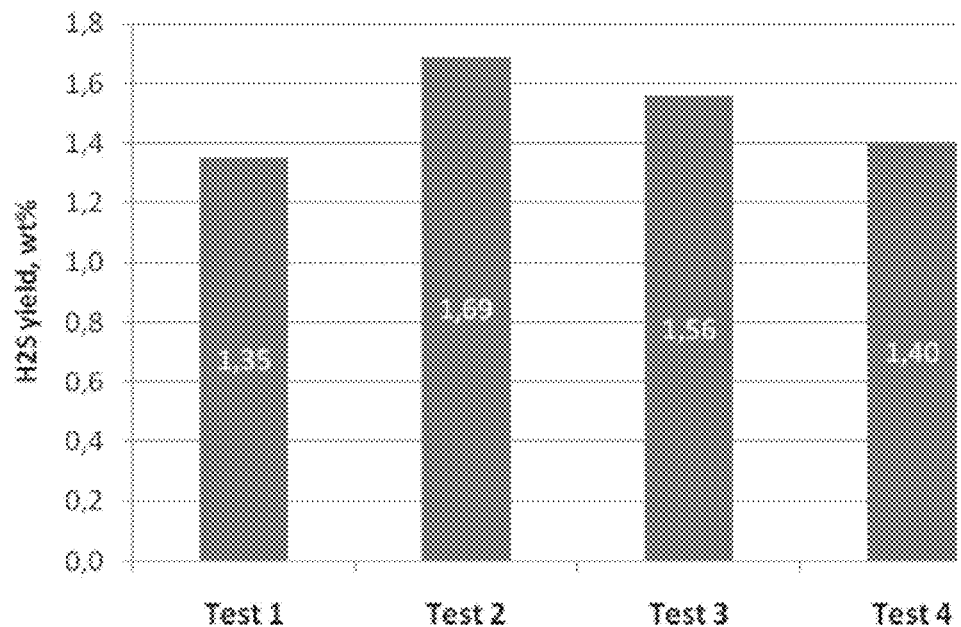
FIG. 6 represents $H_2S$ yields (wt %) for the different tests of example 1 (reaction time: 1 h; temperature: 430° C.).
Figure 7:
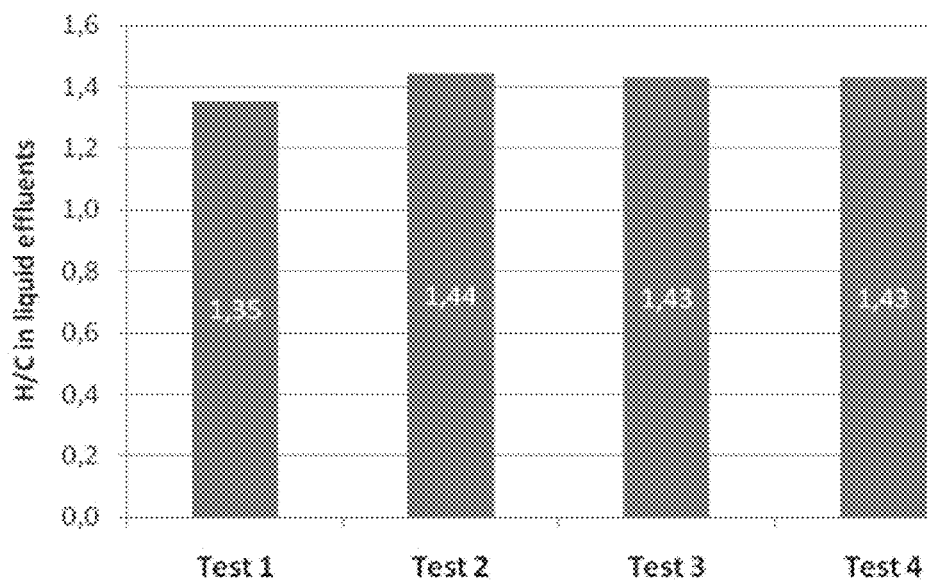
FIG. 7 represents the atomic H/C ratio in liquid in the 500+ fraction for the different tests of example 1 (reaction time: 1 h; temperature: 430° C.).

The waste water processing method is now described with respect to FIG. 5.

Waste water 91 is treated in a stripping column 90 for gas removal in presence of steam 92. The degasified water 101 is then conducted to a first stirred reaction vessel 100, within which are added an Iron(III) chlorosulphate $FeClSO_4$ solution at 40 wt %, sulphuric acid $H_2SO_4$ solution at 96 wt %, if necessary sodium hydroxide NaOH solution at 23 wt %, as well as polyelectrolyte solution.

The $FeClSO_4$ dosage is regulated such that 22 to 27 L/h is added to 80 to 120 m$^3$/h of waste water. The $H_2SO_4$-dosage is the major addition to ensure an acid pH-value. The pH-value is set between 4.5 and 5.5. A NaOH solution can be added if necessary to regulate the pH-value. About 300 to 400 mL of a polyelectrolyte solution per m$^3$ of waste water is added between the reaction vessel 100 and a clarifying thickener and separator 110 as flocculation additive to improve the capacity to sediment the solid matter that is formed. An example of flocculation additive (polyelectrolyte) includes a mixture of polymers, surfactants and silica.

The clarifying thickener and separator 110 (instrument: SEDIMAT—high duty clarifying thickener) allows separation of the solid matter. The solid matter sinks slowly to the vessel floor and thickens into sludge. The sludge flows to a sludge buffer tank, reservoir of the dewatering part of the process to obtain a first precipitate 112; whereas the remaining clarified water (acidic water 121) flows to a reaction vessel 120.

Within reaction vessel 120, some flocculation additive is added (0.5 to 2 L/h) and the addition of $FeClSO_4$ regulates the basic pH-value, between about 7.8 and 8.5 (the advantage of $FeClSO_4$ is to minimize the addition of NaOH). Similarly, some polyelectrolyte optimizes the flocculation. Here, the polyelectrolyte is a cationic flocculation additive that improves flocculation and precipitation, and thus the metal recovering.

The alkaline water 131 issued from reaction vessel 120 is conducted to a second separator 130 wherein a second precipitate 132 is recovered.

The separated clarified water (alkaline water 131) is further neutralized in a neutralization vessel 140 by $H_2SO_4$ addition and collected in a collecting basin 150 for recycling in the refinery or for further purification.

Precipitates 112 and 132 recovered from separators 110 and 112 are dewatered by filtration or any appropriate mean to obtain cakes. A filter press is a suitable mean for this aim. The residual moisture depends on the filter strainer cloth quality of the filter press, and is about 20 to 35 wt %. These cakes are further treated for metals recovering as explained above.

EXAMPLES

Hydroconversion and hydrotreatment of a vacuum residue have been performed. The tested vacuum residue presents the following characteristics:

TABLE 11 characteristics of vacuum residue tested (Arab Heavy Vacuum residue)

| Characteristic | Value |
| --- | --- |
| API | 3 |
| Density at 15° C. (g/ml) | 1.0581 |
| Sulfur (w %) | 5.58 |
| Nitrogen (w %) | 0.54 |
| MCRT ASTM D4530 (w %) | 25.0 |
| Asphalthenes (C7 insol.), w % | 19.7 |
| C, w % | 84.2 |
| H, w % | 9.9 |
| H/C, atomic ratio | 1.41 |
| Ni, ppm | 70 |
| V, ppm | 215 |
| Cut points from ASTM D7169 | |
| IBP-200° C. fraction (w %) | 0.0 |
| 200-350° C. fraction (w %) | 0.0 |
| 350-500° C. fraction (w %) | 3.10 |
| 500-FBP fraction (w %) | 96.9 |

MCRT: Micro Carbon Residue Test

All tests have been performed in a 500 ml stirred batch reactor with continuous hydrogen feeding at constant pressure. The operating conditions are total pressure at 15 MPa, temperature between 420 and 450° C., $H_2$ flow set at 100 NL/h and stirring speed of 900 rpm.

The vacuum residue is pre-heated to reduce its viscosity and allow its transfer to the reactor. Catalyst precursors (molybdenum octoate, nickel octoate, iron octoate, ferrocene and/or molybdenocene) and liquid DMDS are added to the pre-heated vacuum residue in the reactor which is then closed. Hydrogen is then added and temperature increased with two stages at 250° C. and 320° C. for 10 minutes each. Then the reactor temperature is raised rapidly to the operating value.

At the end of the test, the reactor is cooled down and depressurized. All gaseous and liquid effluents are collected, weighed and analysed.

The gases are analysed on-line by gas chromatography (Agilent G2891 micro Gas Chromatograph) and the reaction products are analysed by high temperature gas chromatography (ASTM D7169) for determining the yields.

Example 1

In this test series, the total catalytic metal (molar) content is kept constant but the Ni/Mo ratio is varied between 0 and 0.5. For this test series, the operating temperature is fixed to 430° C. during one hour.

TABLE 12 concentration of catalytic metals in the different tests (wppm, based on the weight of the feedstock)

| Test | 01 | 02 | 03 | 04 |
| --- | --- | --- | --- | --- |
| ratio Ni/Mo (mol/mol) | 0 | 0.1 | 0.3 | 0.5 |
| Catalyst Mo (wppm) | 500 | 454 | 384 | 333 |
| Catalyst Ni (wppm) | 0 | 28 | 71 | 102 |

For this test series, both molybdenum and nickel are added separately to the feedstock as octoate, which are both in the liquid state at ambient conditions.

Molybdenum octoate has supposedly the following formula: $C_{32}H_{60}MoO_8$. Nickel octoate has the following formula $C_{16}H_{30}NiO_4$.

300 mL of feedstock and the appropriate amount of molybdenum and nickel based catalyst precursors are fed into the reactor (see Table 12). 260 mol % of sulphur (compared to the amount of catalytic metals, molybdenum and nickel) as DMDS is also fed into the reactor as sulphiding agent. The reactor is pressurized with hydrogen and heated to the desired temperature 430° C. at a heating rate of 5° C./min.

Compositions of the products obtained are presented in table 13.

For all the tests, no coke formation was observed.

These results show that the appropriate choice of catalysts permits to enhance the quality of hydroconversion products (more hydrodesulfurisation particularly and higher hydrogen content in the bottom fraction) without modification of the operating conditions or conversion rate and without important modification in the ratios of the conversion products.

The results also show that due the conversion of 500+ cut, the concentration of metals (Mo, Ni, V) in the remaining 500+ increases compared to the original mixture of feed and catalytic metals.

TABLE 13

| tests results | | | | |
|---|---|---|---|---|
| Test | 1 | 2 | 3 | 4 |
| Conversion (+/−3%) | 42.1 | 41.6 | 42.1 | 43.3 |
| Density (15° C.) | 1.009 | 0.992 | 1.007 | 1.006 |
| API | 9 | 10 | 9 | 9 |
| Liquid effluents | | | | |
| Naphtha (C$_5$-200° C.) (wt %) (*) | 6.56 | 6.30 | 6.55 | 6.59 |
| Gas oil (200-350° C.) (wt %) (*) | 14.51 | 14.34 | 14.21 | 14.59 |
| Vacuum Gas oil (350-500° C.) (wt %) (*) | 21.37 | 20.84 | 21.61 | 21.62 |
| Residue (500+° C.) (wt %) (*) | 56.30 | 56.12 | 56.64 | 55.68 |
| S (weight %) | 4.90 | 4.00 | 3.90 | 4.00 |
| N (weight %) | 0.60 | 0.59 | 0.57 | 0.58 |
| H/C | 1.35 | 1.44 | 1.43 | 1.43 |
| Gaseous effluents | | | | |
| C$_1$-C$_2$ (wt %) | 1.45 | 1.50 | 1.38 | 1.32 |
| C$_3$-C$_4$ (wt %) | 1.07 | 1.37 | 1.11 | 1.03 |
| H$_2$ consumption wt % | −2.60 | −2.15 | −3.07 | −2.23 |
| H$_2$S yield (wt %) | 1.35 | 1.69 | 1.56 | 1.40 |
| 500+ fraction of liquid effluents (*) | | | | |
| Ni + V + Mo (ppm) | 1356 | 1313 | 1278 | 1270 |

(*) the range corresponds to the distillation range.

Example 2

Ferrocene

Test series have been performed to compare ferrocene and iron octoate as precursors of an active catalytic phase for the hydroconversion of a vacuum residue.

Ferrocene has the following formula: Cp$_2$Fe (or (C$_5$H$_5$)$_2$Fe).

Iron octoate has the following formula: C$_{24}$H$_{45}$FeO$_6$

The same vacuum residue as in the previous examples was used as feed. Its composition is presented in table 11.

The different tests of a series have been performed at increasing temperature in the 420-450° C. range.

300 mL of feedstock and iron based catalyst precursor are fed into the reactor. For each catalyst precursor, 5000 wppm of Fe as Cp$_2$Fe or as Fe-octoate, is added to the feedstock (wppm: based on the weight of the feedstock). 130 mol % of sulphur (compared to iron) as DMDS is also fed into the reactor as sulphiding agent. The reactor is pressurized with hydrogen and heated to the desired temperature at a heating rate of 5° C./min.

Several tests have been performed with increasing temperature, until coke production appears. This temperature is considered as the maximum allowable temperature for hydroconversion using the particular slurry phase catalyst.

The results are presented in FIG. 8. In this graph conversions are plotted against temperature. The runs in which coke formation occurred are represented by crosses.

With iron octoate as precursor, coke formation occurred at 425° C. The maximum 500+ conversion without coke formation was observed at 420° C., and was of 45 w %.

With ferrocene as precursor, temperature could be raised to 435° C. without coke formation. The 500+ conversion observed at this temperature was of 57 w %.

This example series shows the potential of metallocenes as precursors for obtaining high hydrogenation activity catalysts for heavy feedstocks hydroconversion.

Example 3

Molybdenocene

Tests have been performed to compare bis(cyclopentadienyl)molybdenum dichloride and Mo-octoate as precursors of an active catalytic phase for the hydroconversion of a vacuum residue.

bis(cyclopentadienyl)molybdenum dichloride has the following formula: Cp$_2$MoCl$_2$ (or (C$_5$H$_5$)$_2$ MoCl$_2$).

Molybdenum octoate has supposedly the following formula: C$_{32}$H$_{60}$MoO$_8$ The same vacuum residue as in the previous examples was used as feed. Its composition is presented in table 11.

The different tests of a series have been performed at increasing temperature in the 420-450° C. range.

300 mL of feedstock and molybdenum based catalyst precursor are fed into the reactor. For each catalyst precursor, 500 wppm of Mo as Cp$_2$MoCl$_2$ or as Mo-octoate, is added to the feedstock (wppm: based on the weight of the feedstock). 260 mol % of sulphur (compared to molybdenum) as DMDS is also fed into the reactor as sulphiding agent. The reactor is pressurized with hydrogen and heated to the desired temperature at a heating rate of 5° C./min.

Several tests have been performed with increasing temperature, until coke production appears. This temperature is considered as the maximum allowable temperature for hydroconversion using the particular slurry phase catalyst.

The results are presented in FIG. 9. In this graph conversions are plotted against temperature. The runs in which coke formation occurred are represented by crosses.

With molybdenum octoate as precursor, coke formation occurred at 440° C. The maximum 500+ conversion without coke formation was observed at 435° C., and was of 52 w %.

With bis(cyclopentadienyl)molybdenum dichloride as precursor, temperature could be raised to 450° C. without coke formation. The 500+ conversion observed at this temperature was of 70 w %.

The use of a molybdenocene allows applying higher temperatures than the use of Mo-octoate, thus leading to deeper conversions together with the absence of coke formation.

Example 4

Blank Test

The same test has been performed without any catalyst and with a blend of atmospheric residue. The composition of this feedstock is given in table 14. The hydrogen flow was set at 0 Nl/h. The feedstock was processed during 30 min at a temperature of 420.5° C. An important amount of coke was produced, which illustrates the effect of catalyst for suppression of coke.

TABLE 14 characteristics of vacuum residue tested (Arab Heavy Vacuum residue)

| Characteristic | Value |
|---|---|
| API | |
| Density at 15° C. (g/ml) | 0.9671 |
| Sulfur (w %) | 3.13 |
| Nitrogen (w %) | 0.25 |
| MCRT ASTM D4530 (w %) | 8.3 |
| Asphalthenes (C7 insol.), w % | 2.9 |
| Ni, ppm | 20 |
| V, ppm | 50 |
| Cut points from ASTM D7169 | |
| IBP-200° C. fraction (w %) | 0.0 |
| 200-350° C. fraction (w %) | 5.1 |
| 350-500° C. fraction (w %) | 40.9 |
| 500-FBP fraction (w %) | 54.0 |

MCRT: Micro Carbon Residue Test

The invention claimed is:

1. Process for the hydroconversion of a hydrocarbonaceous feedstock with an atomic H/C ratio of at least 0.25, in the presence of hydrogen and at least one catalyst in at least one reactor, said process comprising a reaction step performed in a reaction section comprising at least one reactor and a separation step performed in a separation section, comprising:
a step of preparation of at least one catalyst from at least one catalyst precursor in one or more preparation reactors upstream from the reaction section, wherein at least one catalyst precursor is bis(cyclopentadienyl)molybdenum dichloride ($(C_5H_5)_2MoCl_2$) and where more than one catalyst precursor is present that may be the same or different;
  (i) at least one preparation reactor feeds one or more reactors of the reaction section, or
  (ii) each preparation reactor is dedicated for catalysts fed to at least a hydroconversion reactor or at least a hydrotreatment reactor of the reaction section;
a step of separation of the solids contained in the liquid effluents issued from the reaction section, said step being performed in a liquid-solid separation apparatus of the separation section;
a step of treatment of the residues issued from the separation section, comprising a partial oxidation step performed in a partial oxidation section wherein said residues are partially oxidized to produce carbon monoxide, hydrogen and a metal containing residue; and
wherein the hydrocarbonaceous feedstock comprises at least one feedstock chosen from atmospheric and vacuum residues, pitch from deasphalting, deasphalted oil, visbroken effluents, shale oils, biomass from ex-situ pyrolysis and ex-situ hydrothermal treatment, coal and petcoke from delayed coker.

2. Process according to claim 1, wherein the hydrocarbonaceous feedstock is mixed with the catalyst precursor in the preparation reactors.

3. Process according to claim 1, wherein each catalyst is prepared in at least two preparation reactors.

4. Process according to claim 1, wherein each catalyst precursor contained in a preparation reactor is dedicated to hydroconversion or hydrotreatment of said hydrocarbonaceous feedstock, and the bis(cyclopentadienyl)molybdenum dichloride is dedicated to the hydroconversion.

5. Process according to claim 4, wherein catalyst(s) other than the catalyst formed from bis(cyclopentadienyl)molybdenum dichloride and dedicated to hydroconversion contain one transition metal selected from group VB, VIB, VIII, in an active state, and catalyst(s) dedicated to the hydrotreatment contain two transition metals in an active state, one transition metal being selected from group VB, VIB, VIII and another transition metal being selected from group VIII.

6. Process according to claim 1, wherein the catalyst precursor in addition to bis(cyclopentadienyl)molybdenum dichloride is selected among naphtenates, octoates, and oxides containing at least one metal selected from Group IIA, IIIB, IVB, VB, VIB, VIIB, VIII, IB and IIB.

7. Process according to claim 1, wherein the catalyst precursor in addition to bis(cyclopentadienyl)molybdenum dichloride is an organometallic coordination compound of formula $C_1C_2ML_n$ (I), where
M is a transition metal selected from group IIA, IIIB, IVB, VB, VIB, VIIB, VIII, IB or IIB of the periodic table of elements,
—$C_1$ and —$C_2$ are monocyclic or polycyclic aryl hydrocarbon ligands that are pi-bonded to M, —$C_1$ and —$C_2$ being the same or different, each of —$C_1$ or —$C_2$ comprising from 0 to 5 substituents R, each substituent R being the same or different, R being selected from:
  a C3-C8 substituted or unsubstituted, monocyclic or polycyclic ring structure that is partially unsaturated, unsaturated or aromatic, fused or not fused to the ligand —$C_1$ or —$C_2$,
  a C3-C8 substituted or unsubstituted, partially unsaturated or unsaturated, linear or branched, alicyclic hydrocarbyl radical, and
  a C1-C8, substituted or unsubstituted, linear or branched, saturated hydrocarbyl radical,
—$C_1$ and —$C_2$ being independent or connected via at least one substituent R, and
-L is a ligand that is sigma-bonded to M, n is an integer equal to 0 to 3, each -L is, independently, a univalent ligand.

8. Process according to claim 7, wherein the organometallic coordination compound is a metallocene compound presenting the general formula (II) below,

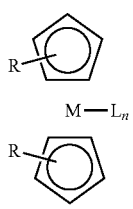

(II)

where the R substituted or unsubstituted cyclopentadienyl ligands are pi-bonded to M, and L ligands are sigma-bonded to M, and where M, L, R and n are defined as in formula (I).

9. Process according to claim 7, wherein -L is selected from Hydride (-L=—H), Halide (-L=—F, —Cl, —Br, —I), cyanide (-L=—CN), Alkoxide (-L=—OR), Thiolate (-L=—SR), Amide (-L=—$NR_2$), Phosphide (-L=—$PR_2$), Alkyl (-L=—$CH_2R$ or other), Alkenyl (-L=—CHCHR), Alkynyl (-L=—CCR), Acyl (-L=—COR), Isocyanide (-L=—CNR), Nitrosyl (-L=—NO), Diazenide (-L=—NNR), Imide (-L==NR), L=-ER$_3$ or -EX$_3$ (with E=Si, Ge, Sn), -L=—PR$_3$, —PX$_3$, —AsR$_3$, —SbR$_3$, amines, L=ER$_2$ (with E=O, S, Se, Te), where X is an halogen atom and R is a C1-C8 linear or branched, alkyl, alkenyl group or a C3-C8 alicyclic or aromatic group.

10. Process according to claim 1, wherein the separation section comprises an atmospheric fractionation followed by a vacuum fractionation, and wherein the separation of the solids is performed upstream from the atmospheric fractionation.

11. Process according to claim 1, wherein the separation section comprises an atmospheric fractionation followed by a vacuum fractionation, and wherein the separation of the solids is performed upstream from the vacuum fractionation.

12. Process according to claim 1, wherein the separation section comprises an atmospheric fractionation followed by a vacuum fractionation, and wherein the separation of the solids is performed downstream from the vacuum fractionation.

13. Process according to claim 1, wherein the liquid-solid separation apparatus is a selected from the group consisting of filters, membranes or centrifuges.

14. Process according to claim 13, wherein the liquid-solid separation apparatus is a multi-stage filter.

15. Process according to claim 1, wherein the step of treatment of residues comprises, after partial oxidation, a step for recovering the metals originally contained in the catalyst and/or the feedstock.

16. Process according to claim 15, wherein the step for recovering the metals successively undergoes (i) calcination to remove carbon containing material, (ii) washing with water, (iii) acidification with sulfuric acid to obtain an acidic water and a first precipitate which is separated, (iv) alkalinization of said acidic water with sodium hydroxide to obtain an alkaline water and a second precipitate which is separated.

17. A method according to claim 16, wherein iron chlorosulfate (FeCl(SO$_4$)) is added at steps (iii) and (iv).

18. A method according to claim 16, wherein (v) said alkaline water is further neutralized with an acid.

19. A method according to claim 16, wherein first and/or second precipitate is introduced into melted iron to obtain vanadium pentoxide (V$_2$O$_5$), and iron-molybdenum-nickel alloy.

20. A method according to claim 1, wherein hydrogen produced during partial oxidation step is recycled to the reaction step.

* * * * *